April 18, 1961   A. L. McCLOY, JR   2,980,237
HELIX CONVEYOR
Filed July 22, 1957
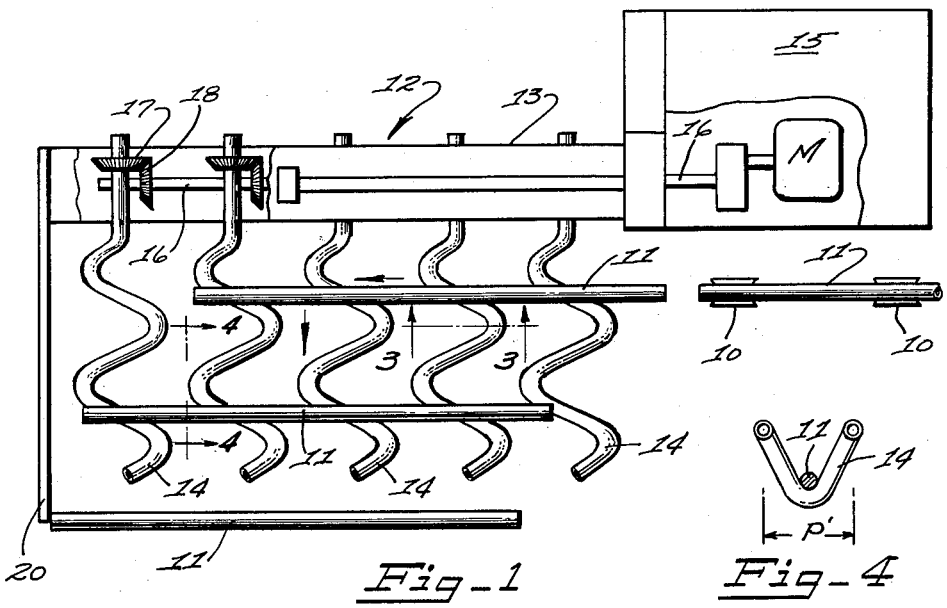
Fig-1
Fig-4
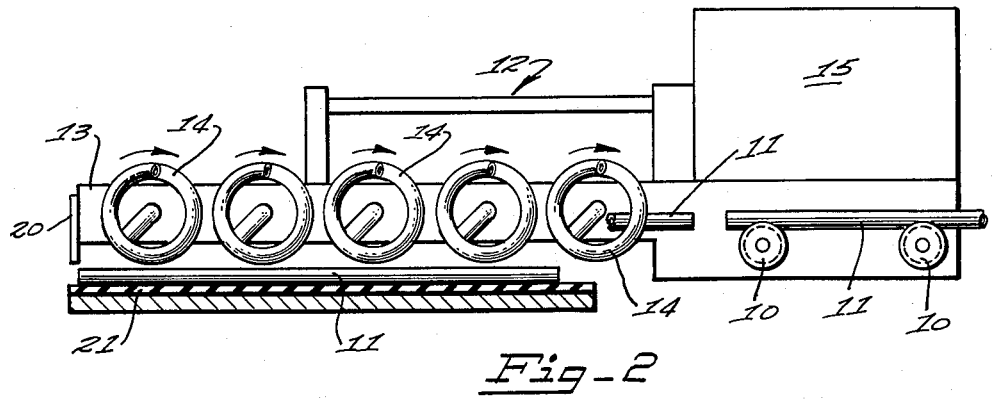
Fig-2
Fig-5
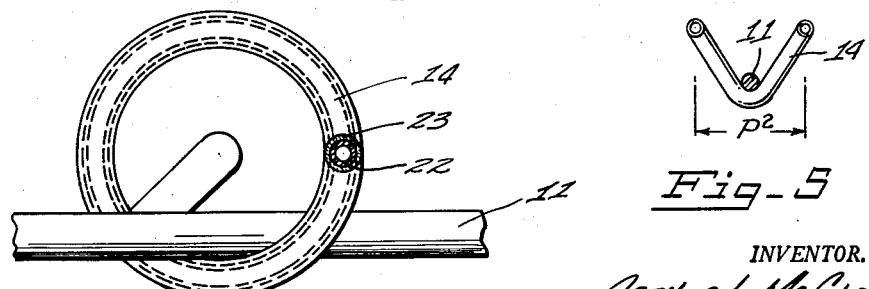
Fig-3
INVENTOR.
Arthur L. McCloy Jr.
BY
W. A. Schaich &
E. J. Holler
ATTORNEYS

United States Patent Office 2,980,237
Patented Apr. 18, 1961

2,980,237

HELIX CONVEYOR

Arthur L. McCloy, Jr., Vineland, N.J., assignor to Kimble Glass Company, a corporation of Ohio Filed July 22, 1957, Ser. No. 673,347

1 Claim. (Cl. 198—213)

My invention relates to mechanism for conveying articles or workpieces and delivering them to another machine or position at which gauging, testing, bundling, end trimming or glazing, or other operations are performed on or in connection with said articles. The invention provides conveying apparatus by which a continuous supply of rod, bar or tubular shaped articles are fed to another machine or operating location, the subject apparatus comprising a plurality of helical operating units which are simultaneously rotated for carrying the lineal articles in transverse relationship.

In the form herein illustrated, a conveyor is provided by which glass rod, tubing, bars or other articles are transported to a desired location in proper alignment utilizing a series of continuously rotating helical members for retaining and transporting the articles in succession.

An object of the present invention is to provide an improved helix conveyor for receiving slender articles thereupon in any regular or slightly irregular sequence and delivering the same to a prescribed location in regularly timed sequence.

A further object of the invention is to provide a conveyor comprising a plurality of rotating helical-shaped elements arranged in a single plane and supported by a base member, extending therefrom in cantilevered relationship, the helical elements adaptable to transporting slender articles in transverse positions while controlling their endwise movement. Feeding of the articles from a fabrication source to the conveyor may be synchronized with the lateral movement of the helical members to deliver the articles at spaced intervals either in the same or another plane.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 represents a plan view showing the rotating means of a conveying mechanism embodying my invention.

Fig. 2 is a side elevation partly in section of the conveyor.

Fig. 3 is an enlarged vertical sectional view of a single helical element taken along line 3—3 of Fig. 1.

Fig. 4 is an enlarged vertical sectional view of one turn of a single helical element taken along the line 4—4 of Fig. 1.

Fig. 5 is a view similar to Fig. 4 showing a variation in the pitch of a single helical element.

Referring to Figs. 1 and 2, the invention as herein illustrated is particularly adaptable for use with a glass tube drawing machine which continuously pulls glass rod or tubing through a so-called "tube drawing alley" from a glass tank and shaping mechanism as conventionally practiced in the art. The tube drawing machine (not shown) normally comprises a lineal series of freely rotatable wheels 10 over which the tube is drawn by two endless belts contacting upper and lower portions of the tube as drawn.

Immediately following and adjacent the tube drawing machine is generally located a traveling cut-off which facilitates severance of the tube into relatively uniform lengths during continuous pulling of the tube. The lengths of glass tubing 11 which are delivered over the horizontally mounted rollers 10 are delivered immediately to the subject improved conveying mechanism 12. The subject invention has particular utility in glass rod and tube manufacturing operations at present, although it is fully contemplated that the conveyor may be similarly applicable to a wide range of utilization in conveying other slender rod, tube, or bar-shaped articles.

Conveyor mechanism 12 comprises a base 13 from which extends a series of helices 14 retained axially within base 13. The supported end of each helix 14 is journaled in bearings within base 13, the opposite end being freely cantilevered in substantially a horizontal plane to a desired delivering position. Within housing 15 at one end of conveyor mechanism 12 is located an electrical motor M suitable for driving the helices 14 in synchronism.

A lengthy drive shaft 16 within base 13 is connected to electrical motor M either directly or through a gear reduction box. Shaft 16 is susceptible to various speeds of rotation for driving helices 14 simultaneously at the desired speed. The restrained end of each helix 14 has a bevel gear 17 mounted on its axial end portion to which is connected another bevel gear 18 on drive shaft 16. Each helix 14 is similarly rotatable by drive shaft 16.

The pitch and diameter may preferably be the same for each helix 14, so that when they are aligned in parallel and operated in synchronism, their roots and crowns reside in the same horizontal planes respectively for conveying rods or tubes 11 horizontally in a lateral direction. With helices 14 operated in a clockwise direction, as indicated on Fig. 2, each of the rods or tubes 11 are simultaneously moved in two directions as shown on Fig. 1. The rods or tubes 11 are moved transversely normal to the lineal direction from which they are fed to the conveyor and simultaneously are also moved from right to left until contact is made with stop plate 20. Stop plate 20 may be adjustable laterally to furnish an index for lengthwise positioning of the articles as delivered.

The rods or tubes 11 which are supported by the roots of helices 14 are delivered from the free ends of the helices just after their ends are rotatably moved through the plane of their roots. The rods or tubes 11 may be deposited on a layer 21 of resilient material, for example, or onto another machine or conveyor. Helices 14 may be inclined upwardly or downwardly at an angle to the horizontal and may be as long as desired, although perhaps limited by cantileverable distortion, of a particular structure, to deliver the rods or tubes 11 to the selected location. Naturally, where lighter-weight articles such as glass rod or tube rather than metal bars are being conveyed, the helices may be longer.

The multiple helices 14 which are similar in shape to a distended compression spring may be made of sections 22 of steel tubing as shown on Fig. 3, for example, which readily permit their fabrication. Each of the helices 14 may be covered with a sleeve 23 of heat-resistant material such as asbestos, for example, to protect glass rods or tubes 11 which may contain considerable residual heat from the tube drawing operation from being marred by contact with the metal.

The conveying mechanism 12 is particularly adaptable to being coupled to a tube drawing machine for synchronization therewith. When the helix conveyor is connected to the tube drawing machine to receive its output of sectionalized glass articles of relatively uniform length, the multiple helices 14 are preferably rotated in the clockwise direction described above. As stated, this action causes the rods or tubes to move in two directions, firstly, toward the deposition point at the free end of helices 14 and, secondly, toward the stop plate 20.

The conveyor has the noteworthy advantages of maintaining complete control over individual sections of glass rod or tubing immediately after their being sequentially cut following passage through the tube drawing machine. This control is accomplished by the natural fall of the rod or tubing within an individual coil of each of the helices 14 which thereby maintain equal spacing of the glass sections as the helices rotate. An attendant advantage is the delivery of the glass rod or tubing to a control point in a timed sequence to auxiliary equipment for a variety of subsequent operations. Among these may be the deposition of the individual sections of rod or tubing onto another conveyor for glazing or trimming one or both of the ends.

In one modification of the present invention the pitch of the coils of the row of helices may be varied to become increasingly greater from one helix to the next in one direction normal to article movement. As shown in Figs. 4 and 5, the pitch of the series of helical coils may be varied from a pitch $P'$ on one side of the conveyor to a pitch $P^2$ on the other side to permit angular delivery of the transported rod or tubing. Thus, with the helices turning at the same angular velocity, one end of the rod or tubing may be conveyed through a greater distance than the other to deposit the articles at an angle to their initial reception upon the conveyor. In this case the overall dimensions of the helices increase in the same direction. By proper regulation of the varied coil pitch so that the helices in rotation pass through their root plane the same number of times, the articles may be conveniently transported and delivered to the prescribed location at a selected angle. The free ends of the helices are arranged to pass through their roots simultaneously during rotation to achieve smooth delivery of the articles.

Various modifications may be resorted to within the spirit and scope of the appended claim.

I claim:

Conveyor mechanism for transporting rod or tubular shaped articles transversely of their length in spaced-apart relation, said mechanism comprising a base member, a series of substantially parallel load-supporting helical members disposed in essentially the same plane and having essentially the same helix diameter, each of said helical members having an axial end portion mounted on said base member in rotatable arrangement and a convoluted portion curved in the same direction projecting in freely cantilevered relation to a point of delivery, rotational means connected to a retained axial end portion of each helical member for effecting simultaneous co-directional rotation thereof, each of said helical members having a heat-resistant covering over its convoluted portion and having substantially the same number of turns, a stationary stop-plate mounted essentially coplanar with the root plane of said helical members for limiting lengthwise movement of said articles during their conveyance for alignment thereof, the pitch dimension of said helical members increasing in a unilateral direction across their mounting plane for delivering said articles angularly from their initially received position.

References Cited in the file of this patent

UNITED STATES PATENTS

| 849,122 | George | Apr. 2, 1907 |
| 1,565,849 | Durand | Dec. 15, 1925 |
| 1,694,675 | White | Dec. 11, 1928 |
| 1,868,860 | Von Reis | July 26, 1932 |

FOREIGN PATENTS

| 333,740 | Germany | Mar. 3, 1921 |